United States Patent
Ota et al.

(10) Patent No.: US 9,403,077 B2
(45) Date of Patent: Aug. 2, 2016

(54) GOLF SWING ANALYZING APPARATUS AND METHOD OF ANALYZING GOLF SWING

(71) Applicants: Seiko Epson Corporation, Tokyo (JP); Keio University, Tokyo (JP)

(72) Inventors: Ken Ota, Fuchu (JP); Kazuhiro Shibuya, Shiojiri (JP)

(73) Assignees: Seiko Epson Corporation (JP); Keio University (JP)

( * ) Notice: Subject to any disclaimer, the term of this patent is extended or adjusted under 35 U.S.C. 154(b) by 284 days.

(21) Appl. No.: 14/043,340

(22) Filed: Oct. 1, 2013

(65) Prior Publication Data

US 2014/0100049 A1    Apr. 10, 2014

(30) Foreign Application Priority Data

Oct. 5, 2012 (JP) .................................. 2012-223326
Oct. 5, 2012 (JP) .................................. 2012-223327

(51) Int. Cl.
A63B 60/46    (2015.01)
A63B 69/36    (2006.01)
G09B 19/00    (2006.01)

(52) U.S. Cl.
CPC ........ A63B 69/3632 (2013.01); G09B 19/0038 (2013.01)

(58) Field of Classification Search
CPC .... A63B 53/00; A63B 69/36; A63B 69/3608; A63B 69/3632; A63B 2069/3602
USPC ................................................ 473/222, 226
See application file for complete search history.

(56) References Cited

U.S. PATENT DOCUMENTS

| 8,109,816 B1* | 2/2012 | Grober ............... | A63B 69/3632 463/3 |
| 2002/0107085 A1* | 8/2002 | Lee ..................... | A63B 24/0003 473/221 |
| 2009/0017930 A1 | 1/2009 | Burnett et al. | |
| 2009/0247312 A1 | 10/2009 | Sato et al. | |
| 2010/0210371 A1* | 8/2010 | Sato .................... | A63B 59/0074 473/223 |
| 2010/0323805 A1 | 12/2010 | Kamino et al. | |
| 2012/0157241 A1* | 6/2012 | Nomura ............. | A63B 69/0002 473/422 |
| 2012/0179418 A1 | 7/2012 | Takasugi et al. | |
| 2013/0005496 A1* | 1/2013 | Priester ............. | A63B 24/0003 473/223 |

FOREIGN PATENT DOCUMENTS

JP    11-169499    6/1999
JP    2004-024488 A    1/2004
(Continued)

OTHER PUBLICATIONS

Robert D. Grober, "An Accelerometer Based Instrumentation of the Golf Club; Comparative Analysis of Golf Swings", Department of Applied Physics, Yale University, New Haven, CT, Dec. 30, 2009, pp. 1-23.

*Primary Examiner* — Allen Chan
(74) *Attorney, Agent, or Firm* — Harness, Dickey & Pierce, P.L.C.

(57) ABSTRACT

An aspect of the invention relates to a golf swing analyzing apparatus, comprising: an arithmetic section operating to process the output of a first inertial sensor and the output of a second inertial sensor to calculate a relative angle between a forearm of a golfer and a golf club, the first inertial sensor being attached to a portion of the upper body of the golfer, the second inertial sensor being attached to the golf club.

9 Claims, 7 Drawing Sheets

(56) References Cited

FOREIGN PATENT DOCUMENTS

| JP | 2008-073210 A | 4/2008 |
| JP | 2009-125507 A | 6/2009 |
| JP | 2009-240677 A | 10/2009 |
| JP | 2010-011926 A | 1/2010 |

* cited by examiner

GOLF SWING ANALYZING APPARATUS AND METHOD OF ANALYZING GOLF SWING

This application is based upon and claims the benefit of priority from the prior Japanese Patent Application No. 2012-223327 filed on Oct. 5, 2012, and the prior Japanese Patent Application No. 2012-223326 filed on Oct. 5, 2012, the entire contents of which are incorporated herein by reference.

BACKGROUND

The present invention relates to a golf swing analyzing apparatus and a method of analyzing golf swings.

A golf swing analyzing apparatus is generally known as disclosed in Japanese Patent Application Publication No. 2010-11926, for example. The golf swing analyzing apparatus utilizes an optical motion capture system for capturing an image of a swing of a golfer. Markers are fixed to specific positions of the golfer and/or a golf club for the capture of the image of the swing. The movement of the markers is recorded as an image for determining the moving paths of the specific positions. In addition, a golf swing analyzing apparatus utilizing an acceleration sensor is also generally known as disclosed in Japanese Patent Application Publication No. 11-169499, for example. An acceleration sensor is attached to the golf club. The form of the golf swing is analyzed based on the acceleration measured by the acceleration sensor.

The golf swing analyzing apparatus utilizing an optical motion capture system as disclosed in Japanese Patent Application Publication No. 2010-11926 requires tremendously large equipment so that it is hard to realize the measurement in the field. A golf swing analysis utilizing an inertial sensor such as an acceleration sensor is recently proposed as disclosed in Japanese Patent Application Publication No. 11-169499. However, the golf swing analysis utilizing an acceleration sensor cannot usefully present a relative angle between the arm and the golf club to users.

SUMMARY

An aspect of the invention relates to a golf swing analyzing apparatus, comprising: an arithmetic section operating to process the output of a first inertial sensor and the output of a second inertial sensor to calculate a relative angle between a forearm of a golfer and a golf club, the first inertial sensor being attached to a portion of the upper body of the golfer, the second inertial sensor being attached to the golf club.

Another aspect of the invention relates to a method of analyzing golf swings, comprising: processing the output of a first inertial sensor and the output of a second inertial sensor to calculate a relative angle between a forearm of a golfer and a golf club, the first inertial sensor being attached to a portion of the upper body of the golfer, the second inertial sensor being attached to the golf club.

DESCRIPTION OF EXEMPLARY EMBODIMENTS

Figure 1:
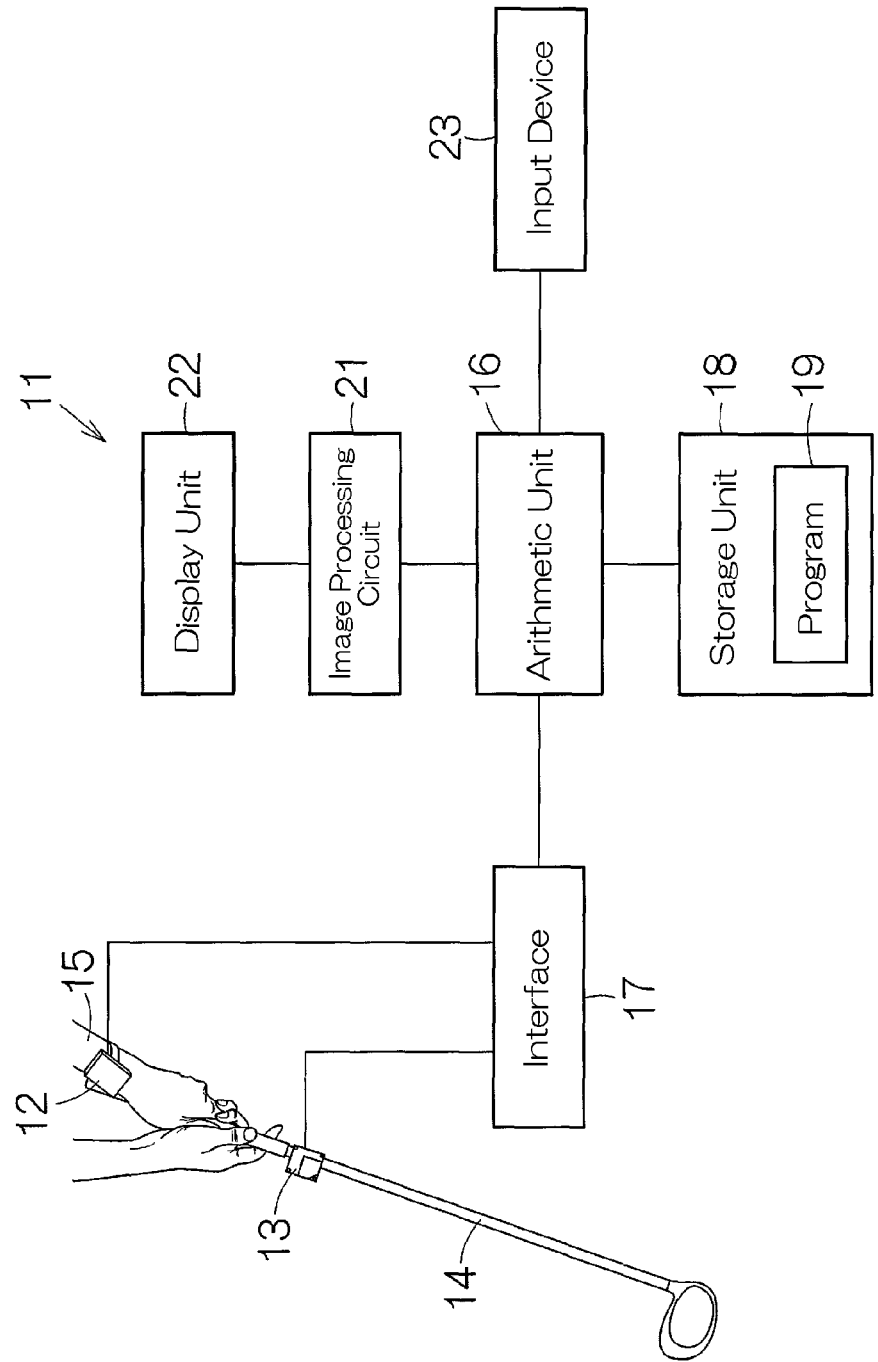
FIG. 1 is a schematic view illustrating the structure of a golf swing analyzing apparatus according to one exemplary embodiment of the invention.

According to at least one aspect of the invention, a golf swing analyzing apparatus and a method of analyzing golf swings are provided to usefully present a relative angle between an arm and a golf club.

(a) An aspect of the invention relates to a golf swing analyzing apparatus comprising an arithmetic section operating to process the output of a first inertial sensor and the output of a second inertial sensor to calculate the relative angle between a forearm of a golfer and the golf club, the first inertial sensor being attached to a portion of the upper body of the golfer, the second inertial sensor being attached to the golf club.

It is preferable to fix the relative angle between the forearm and the golf club at an initial stage from the top in a golf swing. If a golfer is capable of loosening the wrist to allow a natural rotation of the golf club relative to the forearm, the golfer is supposed to enjoy an increased head speed. The golf swing analyzing apparatus is configured to present the relative angle between the forearm and the golf club to a user. The observation of the relative angle between the forearm and the golf club enables discovery of the form of golf swing which results in an efficient transfer of the energy to the golf club. Indices are in this manner provided for the form of golf swing. For example, repetition of changing the form in combination with the subsequent observation realizes a superior improvement effected on the form of golf swing through try and error.

(b) The golf swing analyzing apparatus may operate to utilize a three-dimensional double pendulum model to calculate the relative angle, the portion of the upper body of the golfer forming a first link of the three-dimensional double pendulum model, the golf club forming a second link of the three-dimensional double pendulum model. A golf swing is in this manner fitted into a model. The three-dimensional double pendulum model kinetically represents the movement of a golf swing with a relatively high accuracy. The golf swing is in this manner effectively analyzed.

(c) A fulcrum of the first link may be located at the center of a line connecting the shoulders of the golfer, the joint between the first link and the second link being located on the grip of the golf club. A golf swing is thus analyzed with a higher accuracy.

(d) Each of the first inertial sensor and the second inertial sensor may include an acceleration sensor and a gyro sensor. The acceleration sensor and the gyro sensor enable a precise detection of the acceleration and the angular velocity for the calculation of the relative angle.

(e) The golf swing analyzing apparatus may operate to process the output of the first inertial sensor and the output of the second inertial sensor to calculate a total energy change rate for the portion of the upper body of the golfer. The derivation of the total energy change rate contributes to discovery of the form of golf swing which results in an efficient transfer of the energy to the golf club. Indices are in this manner provided for the form of golf swing.

(f) The golf swing analyzing apparatus may include an energy change rate inversion detecting section configured to detect the inversion of the positive/negative signs of the total energy change rate for the portion of the upper body of the golfer. The detection of the inversion contributes to discovery of the form of golf swing which results in an efficient transfer of the energy to the golf club. Indices are in this manner provided for the form of golf swing. For example, repetition of changing the form in combination with the subsequent observation realizes a superior improvement effected on the form of golf swing through try and error.

In particular, relating the timing of the zero crossing to the change of the relative angle contributes to a further improvement of the form of golf swing.

(g) The golf swing analyzing apparatus may include an image data generating section generating an image data for displaying the change of the relative angle. The change of the relative angle serves to provide an index for improvement of the form of golf swing.

(h) The image data generating section may generate an image data for displaying an image of information on the timing of the inversion superimposed on an image of the relative angle. The displayed image serves to provide an index for improvement of the form of golf swing.

(i) Another aspect of the invention relates to a method of analyzing golf swings, comprising: processing the output of a first inertial sensor and the output of a second inertial sensor to calculate the relative angle between a forearm of a golfer and the golf club, the first inertial sensor being attached to a portion of the upper body of the golfer, the second inertial sensor being attached to the golf club.

It is preferable to fix the relative angle between the forearm and the golf club at an initial stage from the top in a golf swing. If a golfer is capable of loosening the wrist to allow a natural rotation of the golf club relative to the forearm, the golfer is supposed to enjoy an increased head speed. The golf swing analyzing apparatus is configured to present the relative angle between the forearm and the golf club to a user. The observation of the relative angle between the forearm and the golf club enables discovery of the form of golf swing which results in an efficient transfer of the energy to the golf club. Indices are in this manner provided for the form of golf swing. For example, repetition of changing the form in combination with the subsequent observation realizes a superior improvement effected on the form of golf swing through try and error.

(j) Still another aspect of the invention relates to a method of displaying an analysis on a golf swing, comprising: displaying an image including the change of the relative angle between a forearm of a golfer and a golf club, and information on a timing of the inversion of positive/negative signs of the total energy change rate for a portion of the upper body of the golfer.

A detailed description will be made below on an exemplary embodiment of the invention referring to the attached drawings. It is to be understood that both the foregoing general description and the following detailed description are exemplary and explanatory and are not restrictive of the invention as claimed, and all elements of the exemplary embodiment may not be indispensable to a solution of the invention.

(1) Structure of Golf Swing Analyzing Apparatus

FIG. 1 schematically illustrates the structure of a golf swing analyzing apparatus 11 according to one embodiment of the invention. The golf swing analyzing apparatus 11 includes a first inertial sensor 12 and a second inertial sensor 13, for example. The first and second inertial sensors 12, 13 individually include an acceleration sensor and a gyro sensor assembled therein. The acceleration sensor is configured to detect the acceleration in the directions of three axes of an orthogonal coordinate system. The gyro sensor is configured to detect the angular velocity around each of three axes of an orthogonal coordinate system. The first and second inertial sensors 12, 13 output detection signals. The detection signals specify the magnitude of the acceleration and the angular velocity for the individual axes of an orthogonal coordinate system. The acceleration sensors and the gyro sensors are expected to detect the acceleration and the angular velocity with a relatively high accuracy. The first inertial sensor 12 is attached to an arm 15 or a hand, for example, to the left arm for the right-handed golfer. Here, although the first inertial sensor 12 is attached to a forearm of a golfer, the first inertial sensor 12 may be attached to a brachium of a golfer. The second inertial sensor 13 is attached to a golf club 14. Preferably, the second inertial sensor 13 is attached to the grip or shaft of the golf club 14. The first and second sensors 12, 13 may respectively be fixed to the arm 15 and the golf club 14 in an immobilized manner. Here, a detection axis of the second inertial sensor 13 is set in parallel with the longitudinal axis of the golf club 14. It should be noted that the first inertial sensor 12 may be mounted to the upper body of a golfer, especially to the shoulders, although the first inertial sensor 12 is attached to the arm 15 in this embodiment.

The golf swing analyzing apparatus 11 includes an arithmetic unit 16. The first and second inertial sensors 12, 13 are connected to the arithmetic unit 16. An interface circuit 17 is connected to the arithmetic unit 16 for the connection of the first and second inertial sensors 12, 13. The interface circuit 17 may be connected to the first and second inertial sensors 12, 13 with or without wires. The arithmetic unit 16 receives the detection signals from the first and second inertial sensors 12, 13.

A storage unit 18 is connected to the arithmetic unit 16. For example, a golf swing analyzing software program 19 and related data are stored in the storage unit 18. The arithmetic unit 16 executes the golf swing analyzing software program 19 to realize a method of analyzing golf swings. The storage unit 18 may include a dynamic random access memory (DRAM), a large capacity storage unit, a non-volatile memory, and the like. For example, the DRAM temporarily holds the golf swing analyzing software program 19 for the realization of the method of analyzing golf swings. The golf swing analyzing software program 19 and data are stored in the large capacity storage unit such as a hard disk drive unit (HDD). A relatively small program such as a basic input/output system (BIOS) and relatively small data may be stored in the non-volatile memory.

An image processing circuit 21 is connected to the arithmetic unit 16. The arithmetic unit 16 supplies image data to the image processing circuit 21. A display unit 22 is connected to the image processing circuit 21. An interface circuit, not depicted, is connected to the image processing circuit 21 for the connection of the display unit 22. The image processing circuit 21 supplies imaging signals to the display unit 22 in accordance with the supplied image data. The imaging signals determine images displayed on the screen of the display unit 22. A liquid crystal display or any other type of a flat panel display may be utilized as the display unit 22. Here, the arithmetic unit 16, the storage unit 18 and the image processing circuit 21 are provided in the form of a computer apparatus, for example.

An input device 23 is connected to the arithmetic unit 16. The input device 23 at least includes alphabetical keypads and numeric keypads. The input device 23 is utilized to input alphabetical information and numeric information to the arithmetic unit 16. The input device 23 may be a keyboard, for example.

(2) Three-Dimensional Double Pendulum Model

Figure 2:
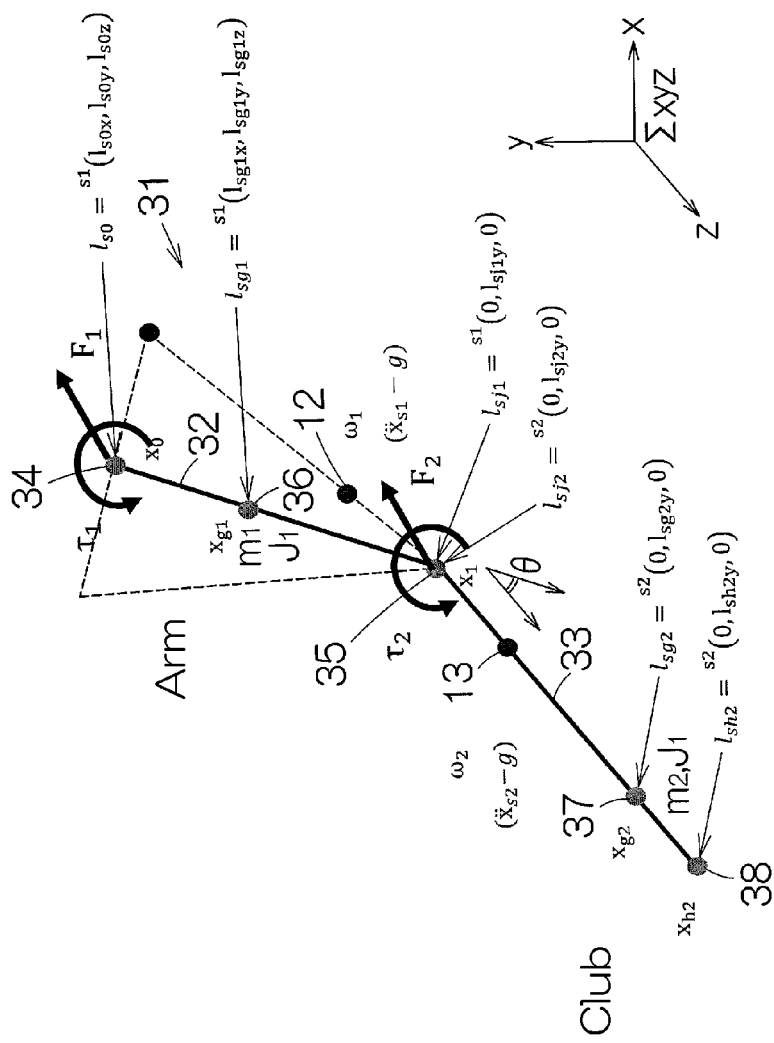
FIG. 2 is a schematic view illustrating the relationship between a three-dimensional double pendulum model and a golfer grasping a golf club.

The arithmetic unit 16 defines an imaginary space. The imaginary space is formed as a three-dimensional space. As depicted in FIG. 2, the three-dimensional space has an absolute reference coordinate system Σxyz. A three-dimensional double pendulum model 31 is constructed in the three-dimensional space in accordance with the absolute reference coordinate system Σxyz. The three-dimensional double pendulum model 31 includes a first link 32 and a second link 33. The end of the first link 32 is coupled to a fulcrum 34 (coordinate $x_0$). The first link 32 thus acts as a spherical pendulum around the fulcrum 34. The fulcrum 34 may move. The end of the second link 33 is coupled to the other end of the first link 32 at a joint 35 (coordinate $x_1$) functioning as a ball joint. The second link 33 thus acts as a spherical pendulum around the joint 34 relative to the first link 32. It is required to identify the mass $m_1$, $m_2$ of the first and second links 32, 33, the inertia tensor $J_1$ of the first link 32 around the fulcrum 34, the inertia tensor $J_2$ of the second link 33 around the joint 35 in the three-dimensional double pendulum model. Here, the absolute reference coordinate system Σxyz serves to locate the centroid 36 of the first link 32 at the coordinate $x_{g1}$, the centroid 37 of the second link 33 at the coordinate $x_{g2}$, and the club head 38 at the coordinate $x_{h2}$.

The three-dimensional double pendulum model 31 corresponds to a representation of a golfer and the golf club 14. The fulcrum 34 of the first link 32 corresponds to the central position between the shoulders in the upper body of the golfer. The joint 35 represents the grip. The second link 33 represents the golf club 14. The first inertial sensor 12 is fixed to the arm 15 of the golfer. The central position between the shoulders can be fixed relative to the first inertial sensor 12. The absolute reference coordinate system Σxyz serves to locate the first inertial sensor 12 at the coordinate $x_{s1}$. The second inertial sensor 13 is fixed to the second link 33. The absolute reference coordinate system Σxyz serves to locate the second inertial sensor 13 at the coordinate $x_{s2}$. The first inertial sensor 12 and the second inertial sensor 13 individually output acceleration signals and angular velocity signals. The acceleration signals from the first inertial sensor 12 and the second inertial sensor 13 respectively specify the acceleration including the effect of the gravity g as follows:

$$(\ddot{x}_{s1}-g), (\ddot{x}_{s2}-g) \quad \text{[Mathematical Expression 1]}$$

The angular velocity signals from the first inertial sensor 12 and the second inertial sensor 13 respectively specify the angular velocity $\omega_1$, $\omega_2$.

The arithmetic unit 16 fixes a local coordinate system $\Sigma_{s1}$ to the first inertial sensor 12. The local coordinate system $\Sigma_{s1}$ has the origin coincident with the origin of the detection axes of the first inertial sensor 12. The local coordinate system $\Sigma_{s1}$ locates the joint 35 on the y-axis. Accordingly, the position $l_{sj1}$ of the joint 35 is identified as the coordinate (0, $l_{sj1y}$, 0) in the local coordinate system $\Sigma_{s1}$. Likewise, the position $l_{s0}$ of the fulcrum 34 and the position $l_{sg1}$ of the centroid 36 are identified as the coordinate ($l_{s0x}$, $l_{s0y}$, $l_{s0z}$) and the coordinate ($l_{sg1x}$, $l_{sg1y}$, $l_{sg1z}$) in the local coordinate system $\Sigma_{s1}$.

The arithmetic unit 16 likewise fixes a local coordinate system $\Sigma_{s2}$ to the second inertial sensor 13. The local coordinate system $\Sigma_{s2}$ has the origin coincident with the origin of the detection axes of the second inertial sensor 13. The longitudinal axis of the golf club 14 coincides with the y-axis of the local coordinate system $\Sigma_{s2}$. Accordingly, the position $l_{sj2}$ of the joint 35 is identified as the coordinate (0, $l_{sj2y}$, 0) in the local coordinate system $\Sigma_{s2}$. Likewise, the position $l_{sg2}$ of the centroid 37 and the position $l_{sh2}$ of the club head 38 are identified as the coordinate (0, $l_{sg2y}$, 0) and the coordinate (0, $l_{sh2y}$, 0) in the local coordinate system $\Sigma_{s2}$.

(3) Structure of Arithmetic Unit

Figure 3:
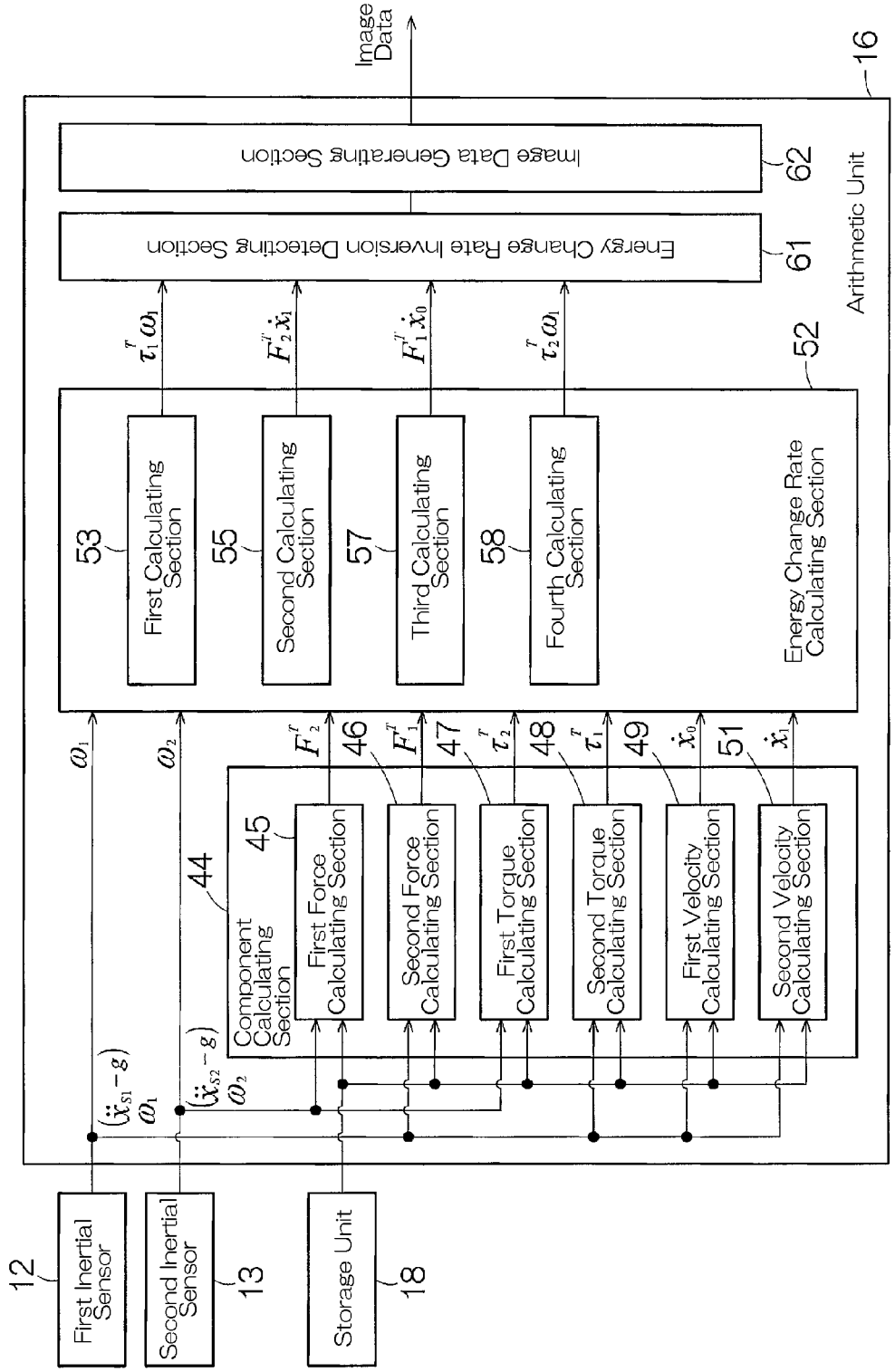
FIG. 3 is a block diagram schematically illustrating the structure of an arithmetic unit.

FIG. 3 schematically illustrates the structure of the arithmetic unit 16. The arithmetic unit 16 includes a component calculating section 44. The acceleration signals and the angular velocity signals are input to the component calculating section 44 from the first inertial sensor 12 and the second inertial sensor 13. The component calculating section 44 calculates, based on the supplied acceleration signals and the supplied angular velocity signals, componential values required in the calculation of the energy change rate. The component calculating section 44 obtains various values from the storage unit 18 for the calculation of the energy change value.

The component calculating section 44 includes a first force calculating section 45. The first force calculating section 45 calculates the first inter-joint force $F_2$ acting on the second link 33. The first force calculating section 45 obtains the acceleration signals from the second inertial sensor 13 and a first mass data of the golf club 14 for the calculation of the first inter-joint force $F_2$. The first mass data specifies the mass $m_2$ of the golf club 14. The first mass data may previously be stored in the storage unit 18. The first inter-joint force $F_2$ is calculated in accordance with the following mathematical expression:

$$F_2 = m_2(\ddot{x}_{g2}-g) \quad \text{[Mathematical Expression 2]}$$

In this case, the following component represents the acceleration of the centroid 37 of the second link 33:

$$(\ddot{x}_{g2}-g) \quad \text{[Mathematical Expression 3]}$$

The constant g represents the gravity. The acceleration of the centroid 37 is determined based on the measurement of the second inertial sensor 13. The first force calculating section 45 outputs a first inter-joint force signal specifying the value of the first inter-joint force $F_2$.

The component calculating section 44 includes a second force calculating section 46. The second force calculating section 46 calculates the second inter-joint force $F_1$ acting on the first link 32. The second force calculating section 46 obtains the acceleration signals from the first inertial sensor 12, a second mass data and the first inter-joint force signals for the calculation of the second inter-joint force $F_1$. The second mass data specifies the mass $m_1$ of the arm 15. The second mass data may previously be stored in the storage unit 18. The second inter-joint force $F_1$ is calculated in accordance with the following mathematical expression:

$$F_1 = m_1(\ddot{x}_{g1}-g) + F_2 \quad \text{[Mathematical Expression 4]}$$

In this case, the following component represents the acceleration of the centroid 36 of the first link 32:

$$(\ddot{x}_{g1}-g) \quad \text{[Mathematical Expression 5]}$$

The acceleration of the centroid 36 is determined based on the measurement of the first inertial sensor 12. The second force calculating section 46 outputs a second inter-joint force signal specifying the value of the second inter-joint force $F_1$.

The component calculating section 44 includes a first torque calculating section 47. The first torque calculating section 47 calculates torque $\tau_2$ acting on the second link 33 around the joint 35. The first torque calculating section 47 obtains the angular velocity signals from the second inertial sensor 13, a first inertia tensor data, a first position data, a second position data and the first inter-joint force signals for the calculation of the torque $\tau_2$. The first inertia tensor data specifies the inertia tensor $J_2$ of the golf club 14. The first position data specifies the position $l_{sj2}$ of the joint 35 in the local coordinate system $\Sigma_{s2}$. The second position data specifies the position $l_{sg2}$ of the centroid 37 in the local coordinate system $\Sigma_{s2}$. The first inertia tensor data, the first position data and the second position data may previously be stored in the storage unit 18. The first inter-joint force signals may be supplied from the first force calculating section 45. The torque $\tau_2$ is calculated in accordance with the following mathematical expression:

$$\tau_2 = J_2\dot{\omega}_2 + \omega_2 \times J_2\omega_2 + \|l_{sg2} - l_{sj2}\|e_{l2} \times F_2 \qquad \text{[Mathematical Expression 6]}$$

Here, the unit vector $e_{l2}$, determines the longitudinal direction from the grip end to the club head of the golf club 14. The first torque calculating section 47 outputs a first torque signal specifying the value of the torque $\tau_2$.

The component calculating section 44 includes a second torque calculating section 48. The second torque calculating section 48 calculates torque $\tau_1$ acting on the first link 32 around the fulcrum 34. The second torque calculating section 48 obtains the angular velocity signals from the first inertial sensor 12, a second inertia tensor data, a third position data, a fourth position data, a fifth position data, the first inter-joint force signals, the second inter-joint force signals and the first torque signal for the calculation of the torque $\tau_1$. The second inertia tensor data specifies the inertia tensor $J_1$ of the arm 15. The third position data specifies the position $l_{s0}$ of the fulcrum 34 in the local coordinate system $\Sigma_{s1}$. The fourth position data specifies the position $l_{sj1}$ of the joint 35 in the local coordinate system $\Sigma_{s1}$. The fifth position data specifies the position $l_{sg1}$ of the centroid 36 in the local coordinate system $\Sigma_{s1}$. The second inertia tensor data and the third to fifth position data may previously be stored in the storage unit 18. The first inter-joint force signals may be supplied from the first force calculating section 45. The second inter-joint force signals may be supplied from the second force calculating section 46. The torque $\tau_1$ is calculated in accordance with the following mathematical expression:

$$\tau_1 = J_1\dot{\omega}_1 + \omega_1 \times J_1\omega_1 + \|l_{sg1} - l_{s0}\|e_{l1} \times F_1 + \|l_{sj1} - l_{sg1}\|e_{l1} \times (-F_2) + \tau_2 \qquad \text{[Mathematical Expression 7]}$$

Here, the unit vector $e_{l1}$ determines the longitudinal direction of the first link 32. The second torque calculating section 48 outputs a second torque signal specifying the value of the torque $\tau_1$.

The component calculating section 44 includes a first velocity calculating section 49. The first velocity calculating section 49 calculates the velocity of the movement of the fulcrum 34. The first velocity calculating section 49 obtains the acceleration signals and the angular velocity signals from the first inertial sensor 12 and the third position data for the calculation of the velocity. The first velocity calculating section 49 operates to calculate the acceleration of the fulcrum 34 in accordance with the following mathematical expression:

$$\ddot{x}_0 = \ddot{x}_{s1} + \dot{\omega}_1 \times l_{s0} + \omega_1 \times (\omega_1 \times l_{s0}) \qquad \text{[Mathematical Expression 8]}$$

The calculated acceleration is subjected to integration in accordance with the following mathematical expression:

$$\dot{x}_0 = \int \ddot{x}_0 dt \qquad \text{[Mathematical Expression 9]}$$

This calculation results in the velocity of the movement of the fulcrum 34 (coordinate $x_0$). It should be understood that the initial velocity equals zero in this case. The first velocity calculating section 49 outputs a first velocity signal specifying the velocity of the movement of the fulcrum 34.

The component calculating section 44 includes a second velocity calculating section 51. The second velocity calculating section 51 calculates the velocity of the movement of the joint 35. The second velocity calculating section 51 obtains the acceleration signals and the angular velocity signals from the first inertial sensor 12 and the fourth position data for the calculation of the velocity. The second velocity calculating section 51 operates to calculate the acceleration of the joint 35 in accordance with the following mathematical expression:

$$\ddot{x}_1 = \ddot{x}_{s1} + \dot{\omega}_1 \times l_{sj0} + \omega_1 \times (\omega_1 \times l_{sj0}) \qquad \text{[Mathematical Expression 10]}$$

The calculated acceleration is subjected to integration in accordance with the following mathematical expression:

$$\dot{x}_1 = \int \ddot{x}_1 dt \qquad \text{[Mathematical Expression 11]}$$

This calculation results in the velocity of the movement of the joint 35 (coordinate $x_1$). It should be understood that the initial velocity equals zero in this case. The second velocity calculating section 51 outputs a second velocity signal specifying the velocity of the movement of the joint 35.

The arithmetic unit 16 includes an energy change rate calculating section 52. The angular velocity signals are input to the energy change rate calculating section 52 from the first inertial sensor 12 and the second inertial sensor 13. The first and second inter-joint force signals, the first and second torque signals and the first and second velocity signals are likewise input to the energy change rate calculating section 52 from the component calculating section 44. The energy change rate calculating section 52 calculates some energy change rates based on the input signals.

The energy change rate calculating section 52 includes a first calculating section 53. The first calculating section 53 calculates the energy change rate of the first energy amount generated at the arm 15 of the golfer. The first calculating section 53 obtains the second torque signals from the component calculating section 44 and the angular velocity signals from the first inertial sensor 12. The energy change rate of the first energy amount is calculated based on the torque $\tau_1$ and the angular velocity $\omega_1$ in accordance with the following mathematical expression:

$$\tau_1^T \omega_1 \qquad \text{[Mathematical Expression 12]}$$

The first energy corresponds to the inflow energy flowing into the arm 15 resulting from the swing of the golfer. The first calculating section 53 outputs a first energy change rate signal specifying the energy change rate of the first energy amount.

The energy change rate calculating section 52 includes a second calculating section 55. The second calculating section 55 calculates the energy change rate of the second energy amount transferred to the golf club 14 from the arm 15 of the golfer. The second calculating section 55 obtains the first inter-joint force signals and the second velocity signals from the component calculating section 44. The energy change rate of the second energy amount is calculated based on the first inter-joint force $F_2$ and the velocity of the joint 35 in accordance with the following mathematical expression:

$$F_2^T \dot{x}_1 \qquad \text{[Mathematical Expression 13]}$$

The second calculating section 55 outputs a second energy change rate signal specifying the energy change rate of the second energy amount.

The energy change rate calculating section 52 includes a third calculating section 57. The third calculating section 57 calculates the energy change rate of the third energy amount resulting from the second inter-joint force $F_1$ of the first link 32, namely of the arm 15 of the golfer. The third calculating section 57 obtains the second inter-joint force signals and the first velocity signal from the component calculating section 44. The energy change rate of the third energy amount is calculated in accordance with the following mathematical expression:

$$F_1{}^T \dot{x}_0 \quad \text{[Mathematical Expression 14]}$$

The third calculating section 57 outputs a third energy change rate signal specifying the energy change rate of the third energy amount.

The energy change rate calculating section 52 includes a fourth calculating section 58. The fourth calculating section 58 calculates the energy change rate of the fourth energy amount resulting from the torque $\tau_2$ acting on the golf club 14. The fourth calculating section 58 obtains the first torque signals from the component calculating section 44 and the angular velocity signals from the first inertial sensor 12. The energy change rate of the fourth energy amount is calculated in accordance with the following mathematical expression:

$$\tau_2{}^T \omega_1 \quad \text{[Mathematical Expression 15]}$$

The fourth calculating section 58 outputs a fourth energy change rate signal specifying the energy change rate of the fourth energy amount.

The arithmetic unit 16 includes an energy change rate inversion detecting section 61. The energy change rate inversion detecting section 61 determines the timing of the zero crossing of the total energy change rate signal. Here, "zero crossing" means the time point of the total energy change rate signal crossing the "zero" value, or the time point of the inversion from the positive sign to the negative sign of the total energy change rate, or the time point of the balance between the positive value and the negative value of the total energy change rate. The total energy change rate is calculated based on the energy change rate of the first energy amount, the energy change rate of the second energy amount, the energy change rate of the third energy amount and the energy change rate of the fourth energy amount in accordance with the following mathematical expression:

$$\dot{E}_1 = F_1{}^T \dot{x}_0 - F_2{}^T \dot{x}_1 + \tau_1{}^T \omega_1 - \tau_2{}^T \omega_1 \quad \text{[Mathematical Expression 16]}$$

The energy change rate inversion detecting section 61 outputs a zero-crossing signal specifying the change of the total energy change rate along the elapse of time. The time point of the zero crossing is identified based on the change along the elapse of time.

The arithmetic unit 16 includes an image data generating section 62. The image data generating section 62 is connected to the energy change rate inversion detecting section 62. The zero crossing signal is input to the image data generating section 62 from the energy change rate inversion detecting section 61. The image data generating section 62 generates, based on the supplied zero crossing signal, a first image data for visualizing the total energy change rate signal along the elapsed time. The first image data is output toward the image processing circuit 21.

Figure 4:
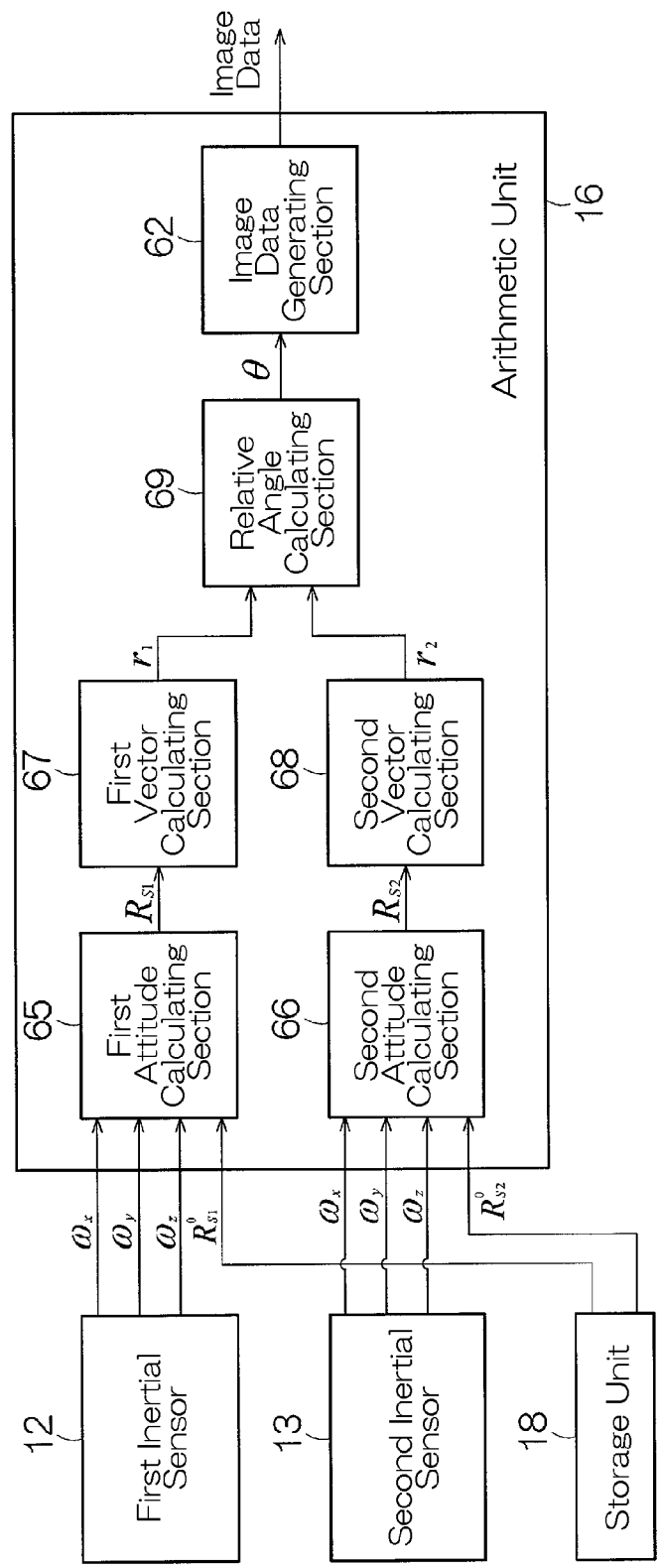
FIG. 4 is a block diagram schematically illustrating a part of the arithmetic unit.

As depicted in FIG. 4, the arithmetic unit 16 includes a first attitude calculating section 65 and a second attitude calculating section 66. The first attitude calculating section 65 calculates the attitude of the first inertial sensor 12. The angular velocity signal is supplied to the first attitude calculating section 65 from the first inertial sensor 12 for the calculation of the attitude. The detection axes are established in the first inertial sensor 12 in accordance with the orthogonal sensor coordinate system for the generation of the angular velocity signal. The angular velocity signal specifies, in accordance with the orthogonal sensor coordinate system, the angular velocity $\omega_x$ around the x-axis, the angular velocity $\omega_y$ around the y-axis, and the angular velocity $\omega_z$ around the z-axis. The first inertial sensor 12 is configured to define the change of the attitude of the first inertial sensor 12 as a rotation matrix per a unit time. For example, if the attitude at the time t is expressed as the rotation matrix $R^t$, the attitude at the time (t+1) is defined as the rotation matrix $R^{t+1}$ in accordance with the following mathematical expression:

$$R^{t+1} = R^t \begin{pmatrix} 0 & -\omega_z & \omega_y \\ \omega_z & 0 & -\omega_x \\ -\omega_y & \omega_x & 0 \end{pmatrix} dt \quad \text{[Mathematical Expression 17]}$$

Here, the following mathematical expression represents the angular velocity at the time (t+1):

$$\omega = (\omega_x, \omega_y, \omega_z) \quad \text{[Mathematical Expression 18]}$$

The component dt corresponds to the interval of sampling in the first inertial sensor 12. The first attitude calculating section 65 outputs a first attitude data specifying the rotation matrix $R_{S1}$ defining the attitude of the first inertial sensor 12 in the absolute reference coordinate system $\Sigma xyz$.

An initial attitude data is supplied to the first attitude calculating section 65 for the calculation of the first inertial sensor 12. The initial attitude data may be stored in the storage unit 18. The initial attitude data specifies the rotation matrix $R^0$ for the initial attitude of the first inertial sensor 12. The rotation matrix $R^0$ describes the relationship between the absolute reference coordinate system $\Sigma xyz$ and the orthogonal sensor coordinate system. The rotation matrix $R^0$ functions to convert the coordinate values of the orthogonal sensor coordinate system to the coordinate values of the absolute reference coordinate system $\Sigma xyz$. The product of the rotation matrix $R^0$ for the initial attitude and the rotation matrix $R^{t+1}$ at the time (t+1) describes the change of the attitude of the first inertial sensor 12 along the elapsed time in the absolute reference coordinate system $\Sigma xyz$. The rotation matrix $R^0$ for the initial attitude is determined based on the attitude of the first inertial sensor 12 at the beginning of a golf swing. Here, a predetermined value is set for the rotation matrix $R^0$ for the initial attitude. Alternatively, the initial attitude of the first inertial sensor 12 may be determined based on the angle of elevation and the direction angle. The angle of elevation may be measured based on the output from the acceleration sensor, for example, and the direction angle may be determined based on the output from a magnetic sensor, for example.

The second attitude calculation section 66 likewise calculates the attitude of the second inertial sensor 13. The second attitude calculating section 66 outputs a second attitude data specifying the rotation matrix $R_{S2}$ defining the attitude of the second inertial sensor 13 in the absolute reference coordinate system $\Sigma xyz$.

The arithmetic unit 16 includes a first vector calculating section 67 and a second vector calculating section 68. The output from the first attitude calculating section 65 is supplied to the first vector calculating section 67. The output from the second attitude calculating section 66 is supplied to the second vector calculating section 68. The first and second vector calculating sections 67, 68 calculate the vector $r_1$, $r_2$ in the y-axis of the first and second inertial sensors 12, 13, respectively, based on the rotation matrices $R_{S1}$, $R_{S2}$ in accordance with the following mathematical expression:

$$r_1 = (0,1,0)R_{S1}$$

$$r_2 = (0,1,0)R_{S2} \quad \text{[Mathematical Expression 19]}$$

The first and second vector calculating sections 67, 68 output vector data, respectively. The vector data specify the vector $r_1$, $r_2$ in the y-axis of the first and second inertial sensors 12, 13, respectively.

The arithmetic unit 16 includes a relative angle calculating section 69. The vector data are supplied to the relative angle calculating section 69 from the first and second vector calculating sections 67, 68. The relative angle calculating section 69 determines the relative angle $\theta$ between the vector $r_1$ and the vector $r_2$ based on the vector $r_1$, $r_2$ in accordance with the following mathematical expression:

$$\theta = \mathrm{acos}\left(\frac{r_1 \cdot r_2}{|r_1| \cdot |r_2|}\right) \quad \text{[Mathematical Expression 20]}$$

The relative angle calculating section 69 outputs a relative angle data. The relative angle data specifies the relative angle $\theta$ in the absolute reference coordinate system $\Sigma xyz$. The relative angle data is supplied to the image data generating section 62.

The image data generating section 62 generates a second image data for visualizing the change of the relative angle $\theta$ along the elapsed time.

(4) Performance of Golf Swing Analyzing Apparatus

A brief description will be made on the performance of the golf swing analyzing apparatus 11. First of all, the golf swing of a golfer is measured. Required information is input to the arithmetic unit 16 through the input device 23 prior to the measurement of a golf swing. Here, one is instructed to input the information including, according to the three-dimensional double pendulum model 31, the mass $m_1$, $m_2$ of the first and second links 32, 33, the inertia tensor $J_1$ of the first link 32 around the fulcrum $x_0$, the inertia tensor $J_2$ of the second link 33 around the joint $x_1$, the length $l_1$ of the first link 32 between the fulcrum $x_0$ and the joint $x_1$, the length $l_{g1}$ between the fulcrum $x_0$ and the centroid $x_{g1}$ of the first link 32, the length $l_{g2}$ between the joint $x_1$ and the centroid $x_{g2}$ of the second link 33, a unit vector $e_{l1}$ in the axial direction of $l_1$, a unit vector $e_{l2}$ in the axial direction of $l_2$, the position $l_{s0}$ of the fulcrum 34 in the local coordinate system $\Sigma_{s1}$, the position $l_{sj1}$ of the joint 35 in the local coordinate system $\Sigma_{s1}$, the rotation matrix $R^0$ for the initial attitude of the first inertial sensor 12, and the rotation matrix $R^0$ for the initial attitude of the second inertial sensor 13. The input information is controlled under a predetermined identifier, for example. The identifier may be utilized to discriminate a predetermined golfer.

The first and second inertial sensors 12, 13 are attached to the arm 15 of the golfer and the golf club 14, respectively, prior to the measurement of a golf swing. The left arm may be selected if the golfer is right-handed. The left arm of the right-handed golfer usually keeps straight to the utmost without bending at the elbow from the beginning of a golf swing to the impact. The first and second inertial sensors 12, 13 are fixed to the arm 15 and the golf club 14, respectively, in an immobilized manner.

The first and second inertial sensors 12, 13 start operating to measure prior to the execution of a golf swing. The first and second inertial sensors 12, 13 are forced to take predetermined positions in predetermined attitudes, respectively, at the beginning of the measurement. These positions and attitudes correspond to those defined by the rotation matrices $R^0$ for the initial attitude. Synchronization is established between the first inertial sensor 12 and the second inertial sensor 13 during the measurement. The first and second inertial sensors 12, 13 keep operating to continuously measure the acceleration and the angular velocity at predetermined intervals. The size of the intervals determines the resolution of the measurement. The detection signals of the first and second inertial sensors 12, 13 may be transmitted to the arithmetic unit 16 in a realtime fashion, or temporarily be stored in storage devices respectively incorporated in the first and second inertial sensors 12, 13. In the latter case, the detection signals may be transmitted to the arithmetic unit 16 with or without wires after the completion of the golf swing.

The arithmetic unit 16 executes the analysis of the golf swing in response to the receipt of the detection signals. The analysis may be effected between the beginning of the golf swing and the finish of the golf swing, or between the beginning of the golf swing and the impact. The arithmetic unit 16 thus operates to calculate the relative angle $\theta$ and the total energy change rate. The image data generating section 62 operates to generate the first and second image data in response to the calculation of the mentioned relative angle $\theta$ and the total energy change rate. The first and second image data are input to the image processing circuit 21. As a result, expected images are displayed on the screen of the display unit 22.

Figure 5:
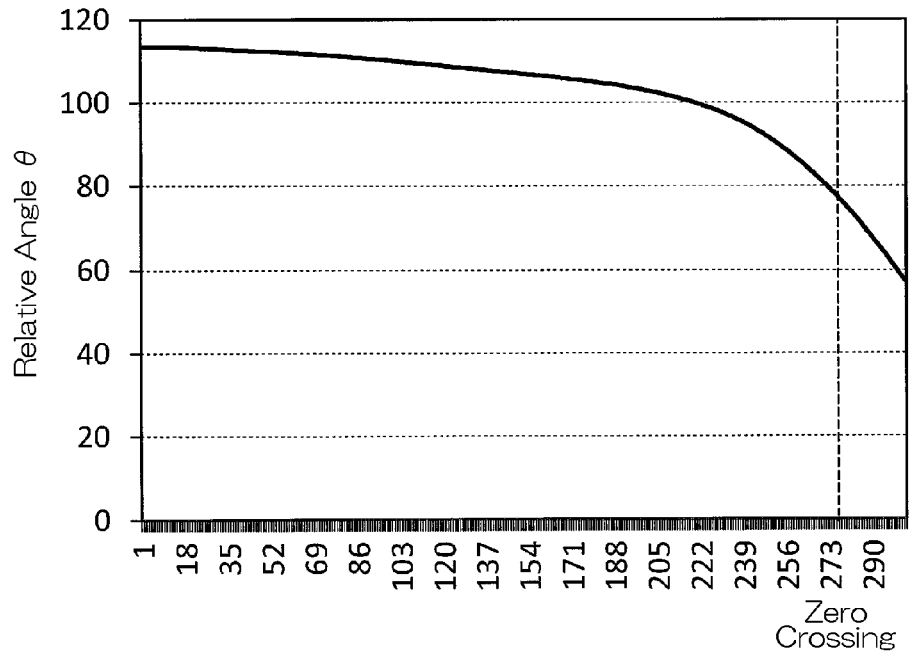
FIG. 5 is a graph illustrating the result of the analysis on a golf swing of a golf teaching professional, specifically the change of the relative angle between the forearm and the golf club along the elapse of time.
Figure 6:
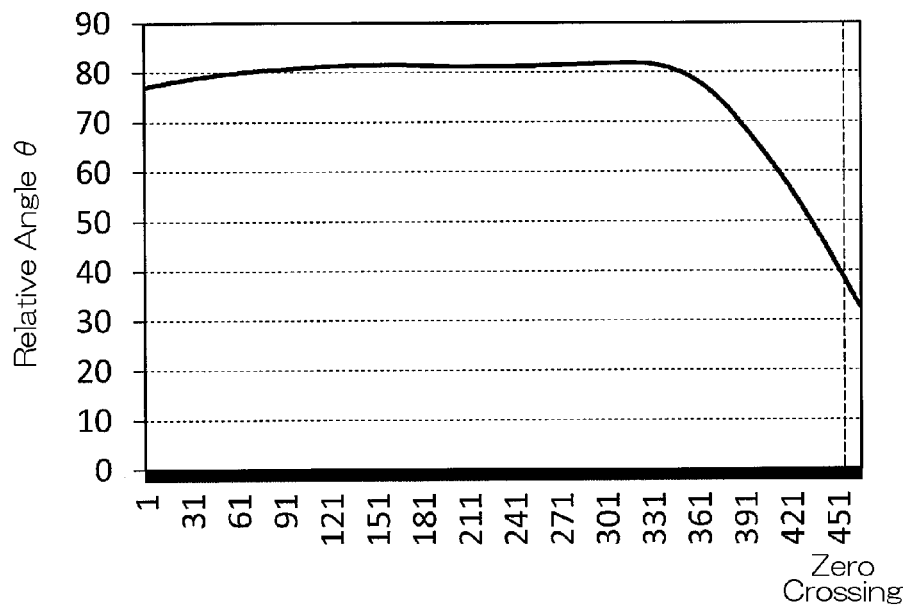
FIG. 6 is a graph illustrating the result of the analysis on a golf swing of an amateur golfer, specifically the change of the relative angle between the forearm and the golf club along the elapse of time.

The inventors have observed the performance of the golf swing analyzing apparatus 11. The golf swing of an amateur golfer and the golf swing of a golf teaching professional are compared with each other in the observation. The inventors observed the relative angle $\theta$ for the golf teaching professional. As depicted in FIG. 5, the inventors have confirmed that the relative angle $\theta$ moderately decreased from the top of the golf swing to the impact of the golf teaching professional. In particular, the observation revealed that the inclination of the decrease enlarged after the relative angle $\theta$ exceeded 100°. On the other hand, as depicted in FIG. 6, the inventors have confirmed that the relative angle $\theta$ was kept at 80° for the duration before a predetermined time point in the golf swing of the amateur golfer. The relative angle $\theta$ suddenly decreased after the predetermined time point in the golf swing of the amateur golfer. The observation of the relative angle $\theta$ in this manner between the arm 15 and the golf club 14 enables discovery of the form of golf swing which results in an efficient transfer of the energy to the golf club. An index is in this manner provided for improvement of the form of golf swing. For example, repeated changes of the form in combination with a subsequent observation enable an accelerated improvement of the form of golf swing through try and error.

Figure 7:
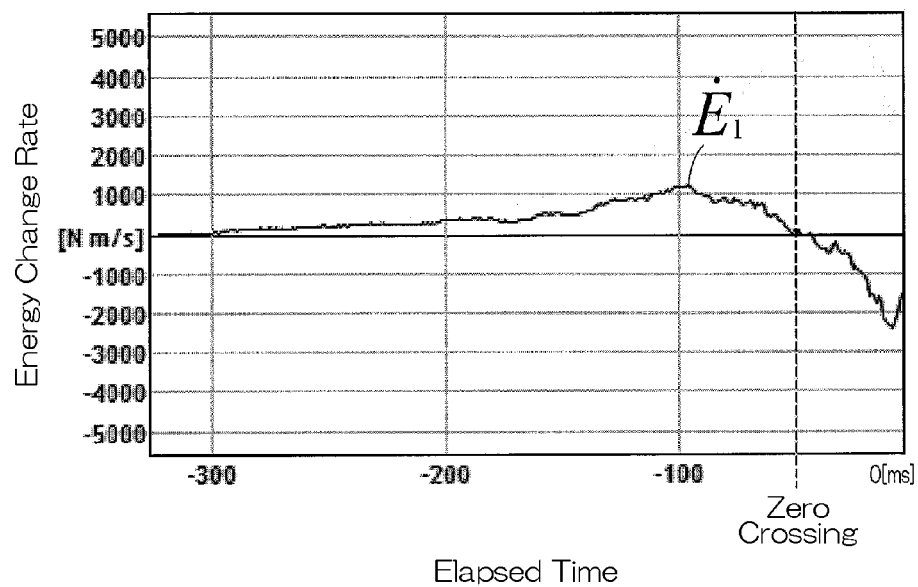
FIG. 7 is a graph illustrating the result of the analysis on a golf swing of a golf teaching professional, specifically the change of the total energy change rate along the elapse of time.
Figure 8:
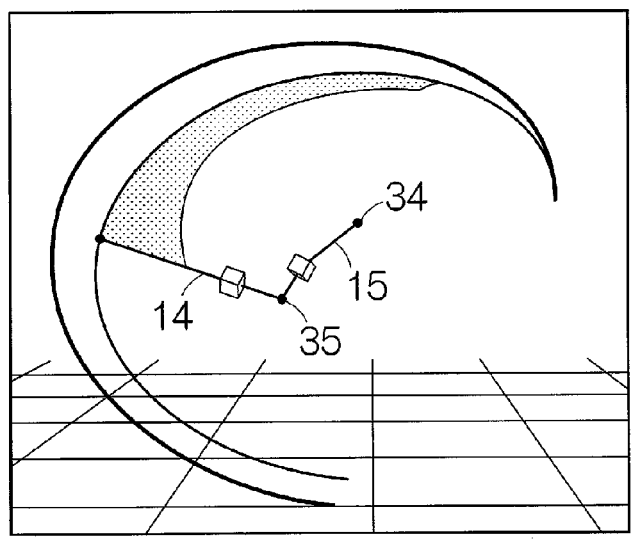
FIG. 8 is a schematic view illustrating the attitude of the golf teaching professional and the golf club at the zero crossing.
Figure 9:
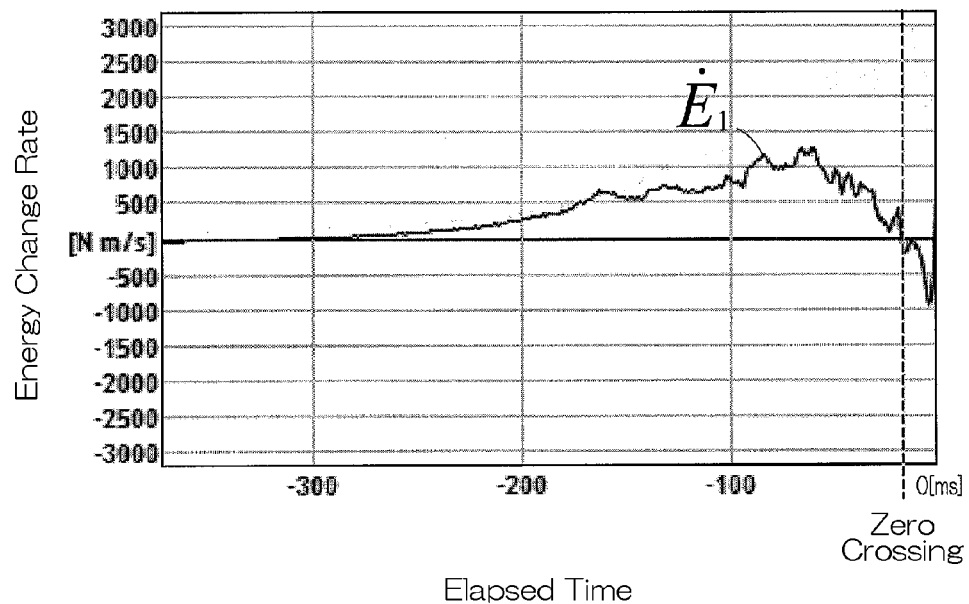
FIG. 9 is a graph illustrating the result of the analysis on a golf swing of an amateur golfer, specifically the change of the total energy change rate along the elapse of time.
Figure 10:
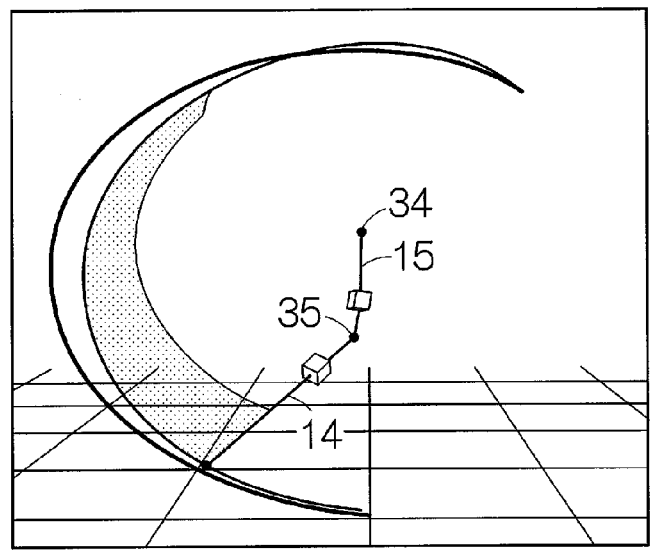
FIG. 10 is a schematic view illustrating the attitude of the amateur golfer and the golf club at the zero crossing.

The inventors have also observed the total energy change rate signal for the golf teaching professional. As depicted in FIG. 7, the inventors found the zero point, the zero crossing in FIG. 7, of the total energy change rate of the arm 15 at an early stage of the golf swing of the golf teaching professional. As depicted in FIG. 8, the inventors have confirmed the total energy change rate of the arm 15 exhibiting the transition from the positive value to the negative value at a relatively high position in the downswing of the golf club 14. It has been confirmed that the pendulum movement of the golf club 14 around the joint 35 started at an early stage of the golf swing of the golf teaching professional. On the other hand, as depicted in FIG. 9, the inventors have found the zero point, the zero crossing in FIG. 9, of the total energy change rate of the arm 15 immediately before the impact in the golf swing of the amateur golfer. As depicted in FIG. 10, the inventors have confirmed the total energy change rate of the arm 15 exhibiting the transition from the positive value to the negative value at a relatively low position in the downswing of the golf club 14. The pendulum movement of the golf club 14 around the joint 35 is expected to contribute to improvement of the transferring ratio η of the energy. The observation of the zero crossing of the total energy change rate enables discovery of the form of golf swing which results in an efficient transfer of the energy to the golf club 14. An index is in this manner provided for improvement of the form of golf swing. For example, repeated changes of the form in combination with a subsequent observation enable an accelerated improvement of the form of golf swing through try and error. In addition, as depicted in FIGS. 5 and 6, correlation of the timing of the zero crossing with the relative angle θ between the arm 15 and the golf club 14 enables a contribution to a further accelerated improvement of the form of golf swing.

The golf swing analyzing apparatus 11 allows establishment of the three-dimensional double pendulum model 31 including a predetermined portion of the upper body of a golfer, namely the arm 15 as the first link 32 and the golf club 14 as the second link 33. A golf swing is in this manner fitted into a model. The three-dimensional double pendulum model 31 kinetically represents the movement of a golf swing with a relatively high accuracy. The golf swing is in this manner effectively analyzed. And further, the fulcrum 34 of the first link 32 is located at the center of a line connecting the shoulders of the golfer. The joint 35 between the first link 32 and the second link 33 is located on the grip of the golf club 14. A golf swing is thus analyzed with a higher accuracy.

It should be noted that it is easily conceivable to a person having ordinary skills in the art to make various modification on the embodiment substantially within the scope of the novel features and effects of the invention although the exemplary embodiment has been described above in detail. The scope of the invention covers all the modifications. For example, the terminology at least once used to mean a broader or similar meaning in the subject specification and attached drawings may have the identical coverage even in the other part of the specification and drawings. In addition, the components and operation of the golf swing analyzing apparatus 11, the first and second inertial sensors 12, 13, the arithmetic unit 16, and the like may not be limited to ones described in the embodiment, and various modification may be made.

What is claimed is:

1. A golf swing analyzing apparatus comprising:
    a first inertial sensor attached to a portion of an upper body of a golfer, the first inertial sensor including a first gyro sensor;
    a second inertial sensor attached to a golf club held by the golfer, the second inertial sensor including a second gyro sensor; and
    an arithmetic section receiving an output of the first inertial sensor and an output of the second inertial sensor, the arithmetic section calculating a relative angle between a forearm of the golfer and the golf club based on the outputs of the first and second inertial sensors,
    the arithmetic section including:
        a first attitude calculating section that calculates a first attitude of the first inertial sensor based on a first angular velocity signal from the first inertial sensor;
        a second attitude calculating section that calculates a second attitude of the second inertial sensor based on a second angular velocity signal from the second inertial sensor;
        a first vector calculating section that calculates a first vector along one axis of the first inertial sensor based on the first attitude;
        a second vector calculating section that calculates a second vector along one axis of the second inertial sensor based on the second attitude; and
        a relative angle calculating section that identifies the relative angle by calculating an angle between the first vector and the second vector.

2. The golf swing analyzing apparatus according to claim 1, wherein the apparatus operates to utilize a three-dimensional double pendulum model to calculate the relative angle, the portion of the upper body of the golfer forming a first link of the three-dimensional double pendulum model, the golf club forming a second link of the three-dimensional double pendulum model.

3. The golf swing analyzing apparatus according to claim 2, wherein a fulcrum of the first link is located at a center of a line connecting shoulders of the golfer, a joint between the first link and the second link being located on a grip of the golf club.

4. The golf swing analyzing apparatus according to claim 1, wherein each of the first inertial sensor and the second inertial sensor further includes an acceleration sensor.

5. The golf swing analyzing apparatus according to claim 1, wherein the apparatus operates to process the output of the first inertial sensor and the output of the second inertial sensor to calculate a total energy change rate for the portion of the upper body of the golfer.

6. The golf swing analyzing apparatus according to claim 5, including an energy change rate inversion detecting section configured to detect an inversion of positive/negative signs of the total energy change rate for the portion of the upper body of the golfer.

7. The golf swing analyzing apparatus according to claim 1, including an image data generating section generating an image data for displaying a change of the relative angle.

8. The golf swing analyzing apparatus according to claim 7, wherein the image data generating section generating an image data for displaying an image of information on a timing of the inversion superimposed on an image of the relative angle.

9. A method of analyzing golf swings, comprising:
    attaching a first inertial sensor to a portion of an upper body of a golfer, the first inertial sensor including a first gyro sensor;
    attaching a second inertial sensor to a golf club held by the golfer, the second inertial sensor including a second gyro sensor;
    calculating a relative angle between a forearm of the golfer and the golf club based on an output of the first inertial sensor and an output of the second inertial sensor;
    calculating a first attitude of the first inertial sensor based on a first angular velocity signal from the first inertial sensor;
    calculating a second attitude of the second inertial sensor based on a second angular velocity signal from the second inertial sensor;
    calculating a first vector along one axis of the first inertial sensor based on the first attitude;
    calculating a second vector along one axis of the second inertial sensor based on the second attitude; and
    identifying the relative angle by calculating an angle between the first vector and the second vector.

* * * * *